Nov. 25, 1924.
H. L. DUNCAN
1,516,807
SPEED AND DISTANCE INDICATOR AND RECORDER
Original Filed March 11, 1913   2 Sheets-Sheet 1
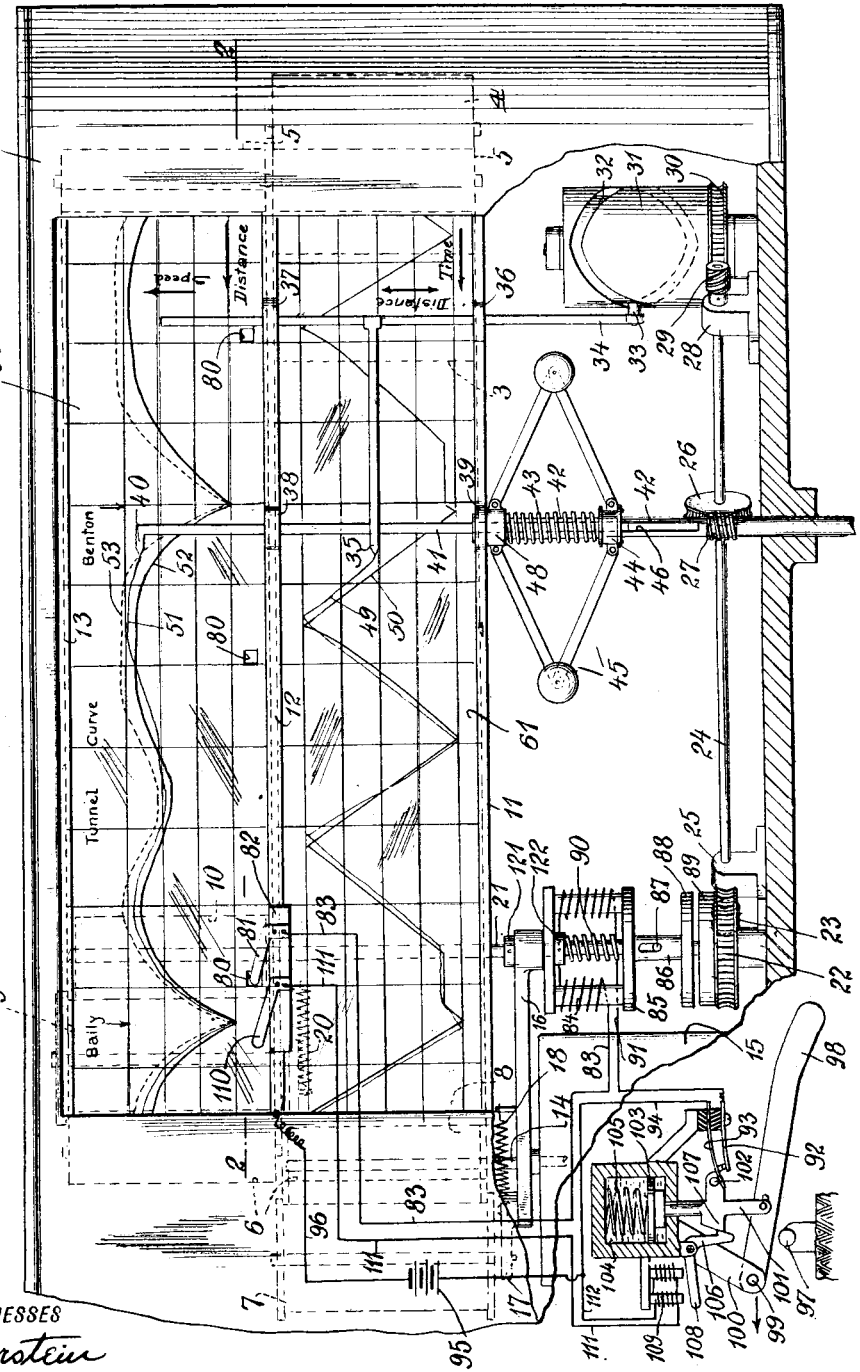

Nov. 25, 1924.
H. L. DUNCAN
1,516,807
SPEED AND DISTANCE INDICATOR AND RECORDER
Original Filed March 11, 1913   2 Sheets-Sheet 2
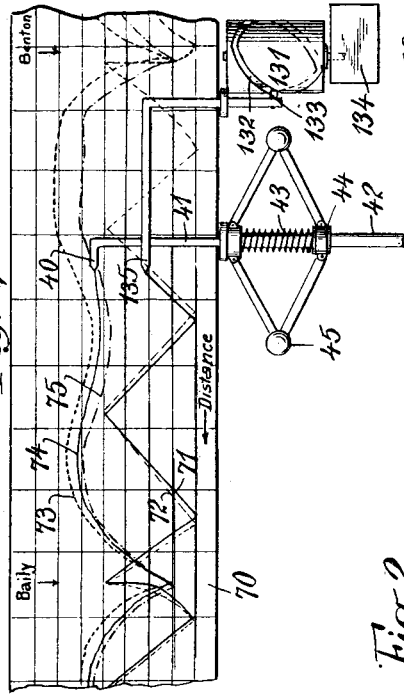

Patented Nov. 25, 1924.

1,516,807

UNITED STATES PATENT OFFICE.

HARRY L. DUNCAN, OF BROOKLYN, NEW YORK.

SPEED AND DISTANCE INDICATOR AND RECORDER.

Application filed March 11, 1913, Serial No. 753,495. Renewed December 16, 1916. Serial No. 137,446.

*To all whom it may concern:*

Be it known that I, HARRY L. DUNCAN, a citizen of the United States, and resident of borough of Brooklyn, county of Kings, city and State of New York, have made a certain new and useful Invention Relating to Speed and Distance Indicators and Recorders, of which the following is a specification, taken in connection with the accompanying drawings, which form part of the same.

This invention relates to speed and distance indicators or recorders and records therefor which are adapted for use on railroad or other vehicles making schedule runs. A compound or combined record may be arranged in connection with cooperating distance and time feeding or marking devices and with speed marking devices so as to form, on the tape or other record, markings showing the travelled distance in connection with a previously formed distance schedule so as to directly compare the actual distance travelled with the scheduled distance for the same time. The speed indicating or marking devices also preferably form a marking on a comparable portion of the record, thus recording the momentary speed of the vehicle throughout its run and furnishing valuable indications to the operator in connection with a previously formed speed schedule and also if desired a maximum allowable speed schedule for the corresponding portion of the route. In the case of distance feed records suitable resetting aligning devices may be employed to reset the record at suitable intervals in accurate alignment with track or route members cooperating with the passing vehicle so as to insure the substantial accuracy of the route and other indications on the record throughout the run of the vehicle.

In the accompanying drawing showing in a somewhat diagrammatic way several illustrative embodiments of this invention, Fig. 1 is a front elevation, parts being broken away.

Fig. 2 is a horizontal section thereof taken substantially along the line 2—2 of Fig. 1.

Fig. 3 shows another arrangement.

Fig. 4 shows still another arrangement; and

Fig. 5 a detail sectional view.

In the illustrative arrangement shown in Figs. 1 and 2, the indicating and recording mechanism may be mounted within any suitable protecting casing which may comprise one or more removable covers or doors 1 secured to the rear or casing member 68 as by the pivotal connections 69 and provided with suitable locking devices such as 67. This cover is preferably formed with one or more openings or windows to allow the record to be viewed from the outside of the recorder and these openings may be provided with panes of glass, such, as 65, secured in position by the removable flange member 66 secured to the cover as indicated in Fig. 2. A suitable record support or plate, such as 2, may be arranged in any desired way within the casing to cooperate with this opening and in the case of a compound comparative record in tape form this support may comprise suitable record guides or flanges, such as 11, 12 and 13, to sufficiently embrace and support the edges of the one or more tapes employed. Suitable guide rolls, such as 5, 6, may be arranged adjacent both ends of the record support, as shown in Fig. 2 and the record tapes may be drawn from suitable rolls or reels 3, 4 mounted on stationary pins and engaged by suitable tension devices, such as the spring tension members 62, 63. The upper tape 60 may thus as indicated pass over the guide roll 5 and across the record support within the overhanging flanges of the record guides 12, 13 and then may pass over the guide roll 6 at the other end of this support and be drawn along at the desired rate by any suitable feeder mechanism. For example, this tape may pass over or be wound upon the feeder reel 9 preferably having suitable flanges at one or both ends and engaged by the feeder roll 10 having a sufficiently roughened or gripping periphery to feed the record along at the desired rate when this feeder roll is driven by any desired mechanism. The feeder reel may be conveniently mounted on the pin 119 in the movable feeder arm 19 which may be pivotally mounted as indicated and normally drawn toward the feeder roll by a suitable spring 20. In this way the substantially uniform linear feed of the record tape is insured and convenient removal and replacement of the tapes is secured by swinging the feeder arm outward against the action of its spring sufficiently to disengage the reel from the feeder roll and allow this reel to be removed from the pin and replaced by another. The cooperating record tape 61 forming this compound comparative record may be drawn from the lower roll or reel 4 and pass over a suitable guide roll, such as 5, and then after passing across the record support between the record guides 11, 12, this tape may pass over the guide roll 6 at the other end of the support and be wound up on a similar reel 7 detachably mounted on the pin 117 in the lower swinging arm 17 normally drawn by the spring 18 toward the feeder roll or device 8, so that the tape is thereby uniformly wound up on the reel.

One of these records, such as 61, may be a time fed record tape on which oscillatory or zigzag distance markings are made by any suitable marking device. This tape may be conveniently fed along the record support in proportion to the elapsed time by driving the time feeder roll or device 8 by a suitable clock mechanism 15 connected to the shaft 14 of this feeder roll. For the convenience of reading, this time fed tape may have any suitable time scale or indications thereon, such as the vertical lines indicated which may of course be numbered to indicate hours or fractions thereof as desired. The oscillatory distance marking may be made on this record by any suitable mechanism of this character, such, for instance, as the distance marker 35 which may be attached in any way to the distance marker rod 34 guided as in the guideways 36, 37, during its reciprocation. This marker rod and marker may be oscillated by a suitable distance cam 31 having the helical cam groove 32 cut therein so that through the cam follower 33 on the marker rod an oscillatory movement is imparted to the marker in proportion to the distance travelled by the vehicle when the cam is rotated in proportion to the distance travelled. This may be done in any suitable way, as for instance, by the driving worm 27 connected by a flexible shaft or other reducing gear to the wheel or driving gear of the vehicle and meshing with the worm wheel 26 on the worm shaft 24 which may be mounted in suitable bearings, such as 25, 28. This worm shaft may have thereon a cam worm 29 meshing with the worm wheel 30 on the cam 31 which is thus driven in proportion to the distance travelled by the vehicle. The oscillatory distance marker is thus moved over the time distance record, and may be of resilient silver strip or other marking material, and produces a zig-zag distance marking 49 on this clay loaded or otherwise prepared record from which the total distance travelled can be readily computed as well as the length of stops and so forth, and if desired this record may have thereon a suitable distance scale or indications, such as the longitudinal lines appearing in Fig. 1, which may of course be designated as indicating miles or suitable fractions or multiples thereof. This record may also with advantage be formed with a distance schedule by printing or otherwise forming thereon this standard distance schedule line 50 which may correspond to an actual or computed run of a vehicle over the route in question. The actual distance record for the trip is formed by the oscillatory distance marking on this same record 61 in the form of a superimposed line 49 which permits the ready visual comparison of the travelled distance with the scheduled distance for the same time. Since this record is fed along in proportion to the elapsed time all points in the same line transversely across the record correspond to the same elapsed time so that by comparing any point in the actual distance marking 49 with the corresponding point directly above or below on the scheduled distance record line 50 it can be readily seen whether the vehicle is ahead or behind its schedule at that time. For example, the marker 35 is shown as traveling downward in Fig. 1 and at once indicates that the vehicle is behind its schedule by the distance corresponding to the vertical displacement of this marker from that part of the distance schedule 50 directly below the marker point.

The cooperating record 60 shown in Fig. 1 may be a distance feed record on which any suitable momentary or instantaneous speed marking is made by suitable mechanism. This tape record may be fed forward in proportion to the distance travelled by the vehicle by any desired feed devices which may comprise the distance feeder roll or device 10 mounted on the shaft 21, as shown in Figs. 1 and 2, and driven in any way as by the distance feeder wheel 22 engaged by the coperating worm 23 on the worm shaft 24. The momentary speed marking on this record may be made by the speed marker 40 which may be of thin resilient silver or other suitable marking material to produce the desired marking on the clay loaded or other suitable paper forming the record, as in the case of the distance marker 35. This speed marker may be operated by its connection with the speed marker rod 41 having square or other noncircular section and guided in the guide bearing 38, its lower end being moved longitudinally in proportion to the speed of the vehicle by any desired speed indicator device. For example, the lower end of this marker rod may pass within the hollow indicator shaft 42 and be provided with a reduced neck, as shown in Fig. 5, which may be engaged by the swivel plate 47 passing through the longitudinal slots 46 formed in the indicator shaft 42 and secured to the motion bearing 44 losely mounted on the outside of this indicator shaft. This motion bearing may be pivotally connected to the weighted indicator arms 45 of usual construction which are also pivotally connected to the indicator head 48 secured to the shaft 42 above and guided in the stationary bearing 39. The indicator spring 43 may, if desired, be interposed between the motion bearing 44 and the indicator head 48, so that the centrifugal action on this indicator raises the motion bearing and speed marker more or less according to the speed of the indicator shaft which may be proportionate to the speed of the vehicle as previously indicated. The speed marking thus made on the distance speed record indicates the momentary speed of the vehicle at that particular time and a suitable speed scale or indications may of course be formed on this record tape and graduated in miles per hour, or any other desired system of units. This record 60 is also preferably provided with a momentary speed schedule which may be printed or otherwise formed thereon in any desired way according to the observed or calculated speeds for a schedule run over the route in question. This standard speed schedule is shown as 52 and of course varies for different parts of the route, falling to zero at the stations where stops are made and otherwise varying in accordance with the grades, curves and other route conditions. It is also of advantage to have a maximum allowable speed schedule formed on such a record such as the line 53 which may with advantage be in the form of a heavy red line indicating a dangerous speed condition for that part of the route. The operator thus has before him at all times a visual indication of the relation of the momentary speed of the vehicle at that time to the scheduled speed decided on as standard for that part of the route and also to the maximum allowable speed therefor, so that in case it is necessary or desirable to make up time the speed of the vehicle can be increased so that the marker is brought up above the speed schedule line 52 and makes the actual speed marking 51 between this line and the maximum allowable speed schedule marking 53 as shown in Fig. 1. It is also of advantage to have such a record carry suitable route indications such as the names of the various stations or stops and some at least of the more important features of the route, such as tunnels or curves in the case of railroads, or special grades or the like in the case of automobile busses or other vehicles making quite regular runs over a definite route. As seen in Fig. 1, the two elements of this compound comparative record are fed forward from right to left and the markers are preferably arranged to cooperate most directly and obviously, and may engage directly comparable portions of the records which as indicated are substantially in the same vertical line, the distance marker for this purpose being brought over the speed marker rod as seen in Figs. 1 and 2. The value of some such travelled distance momentary speed records or indications in connection with superimposed or comparative schedules therefor can be seen by referring to Fig. 1, since the operator can readily see from the time distance record the amount that the train or vehicle is behind the scheduled travelled distance for that time and then by referring to the momentary speed marking directly above can see how the speed of the vehicle compares with the scheduled and maximum allowable speed for that part of the route and regulate running conditions accordingly.

In the case of long railroad runs, for example, especially where there are many curves, it is desirable to maintain the alignment of the distance feed tape or other record as by the use of record resetting aligning devices operated or controlled by track or route members which may be located at suitable intervals along the track or otherwise cooperate with the vehicle in any way. For this purpose, the distance feed record may be formed with any suitable aligning devices which may control the definite or substantial resetting of the record at that point in connection with the corresponding route member so as to ensure the accurate alignment of the distance record with the corresponding portion of the route travelled at any desired intervals of a mile, or any fraction or multiple thereof. For this purpose the distance record 60 may, for example, be provided with aligning devices in the form of apertures 80 punched or otherwise formed therein at the desired distances apart corresponding to distance intervals of a mile or so, for example, and cooperating stop members such as the electric contact member 81 may cooperate therewith, so that when each aligning device or aperture comes under the stop member the paper record no longer prevents this stop member from making electrical contact with the metallic record support or plate for example. This stop member may be conveniently mounted on an insulating block 82 and be connected by the wire 83 with any suitable stop device, such as the magnet 84, the other end of this circuit 91 preferably comprising suitable controller stop device contacts, such as 92, 93 connected by the wire 94 with the battery or other source of electricity 95 and then through the wire 96 with the record support 2. This magnetic stop device 84 may act on a disk armature 85 mounted on the sleeve 86 having a suitable slot engaged by the pin 87 in the distance feeder shaft 21, for example. When this powerful magnetic stop device is actuated by the aligning aperture 80 coming under the stop member 81 this armature and sleeve are drawn up against the strong feed spring 90 thus retracting the connected feed device or friction clutch 88 and disengaging this clutch member from the cooperating member 89 on the distance feed wheel 22 sufficiently to at least considerably retard the feed of the record. Since this magnetic stop device is mounted on the stationary bracket 16 its action may not only disengage the feed clutch, so that the feeder wheel 22 no longer rotates the distance feeder shaft 21 which for this purpose may be loose therein and longitudinally guided as by the collars 121, 122 on this shaft on either side of the bracket 16; but also the stop device may draw the armature 85 which is pinned to this distance feed shaft into holding engagement with the magnetic stop device so that so long as these conditions are maintained the distance feed shaft and distance record are held stationary, the aligning aperture 80 being in exact alignment with the stop member 81. To allow for any reasonable amount of wheel slip or other irregularity in the vehicle driving connections or record feeding mechanism it is desirable to have the feeding devices so proportioned as to normally overfeed the record tape to the extent of a few percent or so, thus bringing each aligning aperture in the record into its aligned position in connection with the stop member a little before the vehicle comes into cooperation with the corresponding route member which may release the stopping device and restart or restore the normal operation of the record feeding mechanism in any desired way. As shown in Fig. 1 the route or track member may comprise a pin or other projection 97 in the path of a suitable resetter arm, such as 98, which may be pivoted about the pin 99 in the bracket 100 on the vehicle and also be connected in any desired way as by the pin and slot connection indicated with the resetting controller 101. For some purposes, it is desirable to have this controller connected with a suitable cushioning device, such as the cushioning piston 103 operating in the cushioning cylinder 104 containing glycerine or other suitable fluid, and also to have the spring 105 normally forcing the controller into its downward position indicated in which through a suitable pin 102, for example, it holds the controller stop device contacts 92, 93 in electrical connection. When, however, the vehicle passes the track member 97 the resetter arm is quickly raised, thus allowing the resilient contact member 93 to spring upward away from the member 92 which breaks the electrical circuit through the magnetic stop device and allows the heavy spring 90 to force the feed device or clutch into engagement again, thus again starting the normal feed of the distance tape. The cushioning device holds the resetting controller in raised position for some time after passing the track member and it may be more definitely held in this raised record feeding or restarting position by suitable means such as the retainer 106 which may be pivotally mounted so that this latch swings under the projection or catch 107 on the controller and positively holds it in raised position. This retainer may be released when the distance tape has again started forward by providing a suitable controller releasing member or contact 110 so as to cooperate with the aligning aperture 80 after the distance tape has moved forward to the desired extent, so that under these circumstances a current from the battery 95 passes through the record support and through this contact member 110 and wire 111 so as to energize the magnetic controller release device 109 and draw up the armature 108 on the retainer 106 whose latch is thus withdrawn from the controller which may be returned by its spring 105 to its normal position shown in full lines for proper cooperation with the succeeding route member.

For some purposes it is more convenient and desirable to have both the travelled distance and momentary speed markings on a single combined comparative record as shown in Fig. 3. This record 70 may be a distance feed record which is fed forward in proportion to the distance travelled by the vehicle and may be provided with suitable route indications of any kind and with suitable distance scale or indications. An oscillatory time distance marking may be made on this record by a time marker 135 having a connected cam follower 133 cooperating with a cam groove 132 in the time cam 131 which may be rotated by a clock mechanism 134. In this way the zig-zag marking 71 is made on the tape indicating the travelled distance in connection with a suitable time scale or indications showing the hours or fractions thereof by suitable horizontal lines in this part of the record. A similarly formed or computed distance schedule 72 is also printed or otherwise formed on the tape in connection therewith, so that the relation of the total distance travelled at any time can be visually compared with the corresponding scheduled distance. This may be readily done as indicated, since corresponding horizontal points on these two records or markings correspond to the same time. Thus the time marker 135 indicates that the vehicle is somewhat behind its schedule since the distance travelled is not quite as much as should have been travelled in this same time because the distance schedule line 72 indicates a greater travelled distance than has actually been passed over by the vehicle. The speed marker 40 shown as cooperating with this combined tape record may be actuated by mechanism similar to what has been already described in connection with Figs. 1 and 2 so as to make a momentary speed marking 74 on this record for direct comparison with the momentary speed schedule 75 and the maximum allowable speed schedule 73 which may be formed on the record in any desired way. Another arrangement is shown in Fig. 4 in which the time feed record 54 is used which may be fed forward by a clock actuated feeding device similar to that used in connection with the record 61. This record 54 may be provided with suitable time indications in hours or fractions thereof which may be designated in any desired way and any suitable distance marker such as the oscillatory distance marker 35 on the marker rod 34 may cooperate with this record to form the zig-zag distance marking 58 thereon for direct comparison with the distance schedule line 59 which may be previously formed on the record. The speed marker 40 on the marker rod 41 may also cooperate with comparable portions of this record, preferably in about the same transverse position so as to form a directly comparable momentary speed marking 56 thereon with which may be advantageously used a previously formed speed schedule 57 and maximum allowable speed schedule 55. Suitable route or station indications may also be formed on this record where the runs are made in approximately schedule time.

Having described this invention in connection with a number of illustrative forms, proportions, materials, parts, devices and arrangements, to the details of which disclosure the invention is not of course limited, what is claimed as new and what is desired to be secured by Letters Patent is set forth in the appended claims:

1. In combination, a distance feed record adapted for use in distance or speed recorders or indicators and having thereon route related indications, a record feed device to feed said record in substantial proportion to the distance travelled by the vehicle and, at a rate somewhat faster than corresponds to said indications, record aligning means comprising aligning devices at intervals in said record, a stop device actuated thereby to intermittently hold said record in aligned position, and controller devices controlling said stop device and adapted to be disengaged when the vehicle cooperates with a route member along the route of the vehicle and start the feeding of said record.

2. In speed recorders or indicators a distance feed record having route indications, a record feed comprising a normally spring engaged feed clutch to feed said record in substantial proportion to the distance traveled by the vehicle and at a rate somewhat faster than corresponds to said indications, and record resetting aligning means comprising perforated aligning devices formed at intervals in said record, an electric stop circuit including a stop contact member cooperating with said aligning devices, and a connected magnetic stop device thereby actuated to disengage said feed clutch and stop the feed of said record to hold said record in aligned position, a resetter device adapted to cooperate with route members arranged at intervals along the route of the vehicle to break said stop circuit and comprising stop device contacts in said stop circuit to be disengaged by the action of said route members and thereupon reengage said feed clutch and restore the normal feeding of the record, a retainer to hold said resetter device in actuating position, and cooperating magnetic controller release devices comprising a releasing contact member cooperating with said aligning devices in said record to disengage said retainer by the restored feeding of said record.

3. In recorders or indicators, a distance feed record, a record feed device to feed said record in substantial proportion to the distance travelled by the vehicle, and record aligning means comprising aligning devices formed at intervals in said record, an electric stop member cooperating therewith and disengaging said record feed device and a resetter adapted to cooperate with route members arranged at intervals along the route of the vehicle to start said feed device in operation.

4. In speed recorders or indicators, a distance feed record having route indications, a record feed comprising a normally engaged feed clutch to feed said record in substantial proportion to the distance traveled by the vehicle and at a rate somewhat faster than corresponds to said indications, and record resetting aligning means comprising aligning devices formed at intervals in said record, an electric stop circuit including a stop contact member cooperating with said aligning devices, and a connected magnetic stop device thereby actuated to disengage said feed clutch and stop the feed of said record to hold said record in aligned position, a resetter device adapted to cooperate with route members arranged at intervals along the route of the vehicle to reengage said feed clutch and restore the normal feeding of the record, a retainer to hold said resetter device in actuating position, and cooperating controller release devices cooperating with said aligning devices in said record to disengage said retainer by the restored feeding of said record.

5. In recorders or indicators, a record feed comprising a normally operating feed device adapted to feed a record in substantial proportion to the distance traveled by the vehicle, and record resetting aligning means comprising an electric stop circuit including a stop contact adapted to cooperate with aligning devices in the record, and a connected magnetic stop device thereby actuated to disengage said feed device and stop the feed of said record to hold said record in aligned position, a resetter device adapted to cooperate with route members arranged at intervals along the route of the vehicle to cooperate with said stop circuit and comprising stop contacts in said stop circuit to reengage said feed device and restore the normal feeding of the record, and a retainer to hold said resetter in actuating position and adapted to be electrically actuated and disengaged upon the restored feeding of said record.

6. In distance or speed recorders, a distance feed record, a record feed device to feed said record at a rate related to the speed of the vehicle, and record resetting aligning means comprising aligning devices formed at intervals in said record, means cooperating therewith and holding said record in aligned position, route members arranged at intervals along the route of the vehicle, and a resetter cooperating with said route members to restart the feeding of said record by said record feed device.

7. In recorders or indicators, a record feed comprising a normally operating feed device adapted to feed a record in substantial proportion to the distance traveled by the vehicle, and record resetting aligning means comprising a stop contact member adapted to cooperate with aligning devices in the record, and a connected stop device thereby actuated to disengage said feed device and stop the feed of said record to hold said record in aligned position, a resetter device adapted to cooperate with route members arranged at intervals along the route of the vehicle to cooperate with said stop member and reengage said feed device and restore the normal feeding of the record, and a retainer to hold said resetter in actuating position and adapted to be actuated and disengaged upon the restored feeding of said record.

8. In recorders or indicators, a record feed comprising a normally operating feed device adapted to feed a record in substantial proportion to the distance traveled by the vehicle, and record resetting aligning means comprising a stop contact member adapted to cooperate with aligning devices in the record and hold said record in aligned position, a resetter device adapted to cooperate with said stop member and restore the normal feeding of the record, and a retainer to hold said resetter in actuating position and adapted to be actuated and disengaged upon the restored feeding of said record.

9. In combination, a record having thereon route related indications, a record feed device to feed said record in substantial proportion to the distance travelled by the vehicle, and record aligning means comprising aligning devices at intervals in said record, a stop member cooperating therewith and holding said record in aligned position, a resetter adapted to cooperate with route members arranged at intervals along the route of the vehicle, a resetting controller connected to said resetter, cooperating controller releasing devices to restart the feeding of said record when said resetter cooperates with a route member and means cooperating with said resetting controller to temporarily hold the same in record restarting position.

10. In combination, a distance feed record having thereon route related schedule indications, a record feed device normally feeding said record in substantial proportion to the distance travelled by the vehicle and at a rate a few per cent faster than corresponds to said indications, and record aligning means comprising aligning devices at intervals in said record and a device adapted to cooperate with route members arranged at intervals along the route of the vehicle to periodically stop the feeding of said record and align the same.

11. In recorders, a distance feed tape record having thereon route related indications, an indicator device cooperating with said record, a record feed device normally feeding said record in substantial proportion to the distance travelled by the vehicle and at a rate a few per cent faster than corresponds to said indications and record aligning means comprising aligning apertures formed at intervals in said record and route members arranged at intervals along the route of the vehicle.

12. In distance or speed recorders or indicators, a distance feed record having indications thereon, a record feed device normally feeding said record in substantial proportion to the distance travelled by the vehicle and at a rate a few per cent faster than corresponds to said indications and record means and realigning means comprising electrically actuated aligning devices formed at intervals in said record, and members actuated at intervals during the travel of the vehicle.

13. In distance or speed recorders or indicators, a distance feed record, a record feed device to feed said record in substantial proportion to the distance travelled by the vehicle, and record realigning means comprising aligning devices at intervals in said record, a stop contact member cooperating therewith and actuating a magnetic stop device disengaging said record feed device and holding said record in aligned position, and a resetter adapted to cooperate with route members arranged at intervals along the route of the vehicle to restart the action of said feed device.

14. In recorders or indicators, a distance feed tape record having thereon route indications, a record feed device to feed said record in substantial proportion to the distance travelled by the vehicle, and record aligning means comprising aligning devices formed at intervals in said record, an electric circuit comprising a stop contact member cooperating with said aligning devices, a magnetic stop device actuated thereby and to intermittently hold said record in aligned position, route members arranged at intervals along the route of the vehicle, and a resetter cooperating with said route members to restart the record feeding action of said feed device.

15. In recorders or indicators, a distance feed record having thereon route related indications and speed schedules, a speed device cooperating with said record, a record feed device to feed said record in substantial proportion to the distance travelled by the vehicle and at a rate faster than corresponds to said indications, and record aligning means comprising aligning devices formed at regular intervals in said record, a retarding member cooperating therewith and retarding the feed of said record and record feed restoring devices adapted to cooperate with route members arranged at regular intervals along the route of the vehicle to effect the substantial alignment of said record and restore the normal feeding thereof.

16. In recorders or indicators, a distance feed record having thereon indications, a record feed device normally feeding said record in substantial proportion to the distance travelled by the vehicle and at a rate faster than corresponds to said indications, and record aligning means comprising aligning devices at intervals in said record and route members arranged at corresponding intervals along the route of the vehicle to retard the feeding of said record and substantially align the same.

17. In recorders or indicators, a distance feed record, a record feed device to normally feed said record in substantial proportion to the distance travelled by the vehicle, and record realigning means comprising aligning devices formed at intervals in said record, a retarding member cooperating therewith and retarding the feed of said record and members actuated at intervals during the travel of the vehicle to intermittently effect the substantial realignment of said record with respect to said feed device and restore the normal feeding thereof.

18. The feeding and aligning mechanism adapted to feed and intermittently realign a record having thereon route related indications and having aligning devices at intervals, said mechanism comprising a record feed device to feed said record at a rate corelated to the speed of the vehicle and faster than corresponds to said route related indications, an electric-contact stop member adapted to cooperate with said aligning devices, a stop device actuated by said stop member and disengaging said record feed device to positively hold said record in aligned position when said stop member engages one of said aligning devices, a resetter adapted to cooperate with route members arranged at intervals along the route of the vehicle, a resetting controller connected to said resetter to disengage said stop device when said resetter cooperates with a route member and thereupon restart the feed of said record, an electric-contact controller releasing member adapted to cooperate with one of said aligning devices after it has cooperated with said stop member, a retainer cooperating with said controller to hold the same in record restarting position and a controller releasing device connected with said releasing member to disengage said retainer and allow said controller to return to its normal position.

19. The feeding and aligning mechanism adapted to feed and intermittently realign a record having thereon route related indications and having aligning devices at intervals, said mechanism comprising a record feed device to feed said record at a rate corelated to the speed of the vehicle, a stop member adapted to cooperate with said aligning devices, a stop device actuated by said stop member and disengaging said record feed device when said stop member engages one of said aligning devices, a resetter adapted to cooperate with route members arranged at intervals along the route of the vehicle, a resetting controller connected to said resetter to disengage said stop device when said resetter cooperates with a route member and thereupon restart the feed of said record, a controller releasing member adapted to cooperate with one of said aligning devices after it has cooperated with said stop member, and a controller releasing device connected with said releasing member to effect the return of said controller to its normal position.

20. The feeding and aligning mechanism adapted to feed and intermittently realign a record having thereon route related indications and having aligning devices at intervals, said mechanism comprising a record feed device to feed said record at a rate corelated to the speed of the vehicle, a stop member adapted to cooperate with said aligning devices and controlling said record feed device when said stop member engages one of said aligning devices to stop the feeding of the record, a resetter adapted to cooperate with route members arranged at intervals along the route of the vehicle to restart the feed of said record, and a releasing member adapted to cooperate with one of said aligning devices after it has cooperated with said stop member to effect the return of said resetter to its normal position.

21. The feeding and aligning mechanism adapted to feed and intermittently realign a record having aligning devices at intervals, and having thereon route related indications, said mechanism comprising a record feed device to feed said record at a rate corelated to the speed of the vehicle and a few per cent faster than corresponds to said route related indications, an electric stop member adapted to cooperate with said aligning devices, a magnetic feed controlling device arranged to be actuated by said stop member, and resetting devices comprising a resetter adapted to cooperate with route members arranged at intervals along the route of the vehicle to bring said record into aligned position when said stop member and resetter operate.

22. The feeding and aligning mechanism adapted to feed and intermittently realign a record having apertured aligning devices formed therein at intervals, and having thereon route related indications including speed or distance schedules, said mechanism comprising a record feed device to feed said record at a rate corelated to the speed of the vehicle and a few per cent faster than corresponds to said route related indications, an electric stop member adapted to cooperate with said aligning devices and connected resetting devices comprising a resetter adapted to cooperate with route members arranged at intervals along the route of the vehicle to disengage said record feed device and bring said record into aligned position when said stop member and resetter operate.

23. The feeding and aligning mechanism adapted to feed and intermittently realign a record having aligning devices at intervals, and having thereon route related indications including speed or distance schedules, said mechanism comprising a record feed device to feed said record at a rate corelated to the speed of the vehicle, a stop member adapted to cooperate with said aligning devices to stop the feeding of the record and connected resetting devices comprising a resetter adapted to cooperate with route members arranged at intervals along the route of the vehicle to bring said record into aligned position when said stop member and resetter operate.

24. In feeding and aligning mechanism adapted to feed and intermittently realign a record having aligning devices at intervals, and having thereon route related indications, a record feed device to feed said record in substantial proportion to the distance traveled by the vehicle and at a rate faster than corresponds to said indications, a stop member adapted to cooperate with said aligning devices and delayed return resetting devices adapted to intermittently cooperate with route members arranged at intervals along the route of the vehicle to thereupon effect the realignment of said record with respect to said record feed device.

25. In recorders or indicators, a distance feed record, a record feed comprising a normally operating feed device to feed said record in substantial proportion to the distance traveled by the vehicle, and record resetting aligning means comprising aligning devices formed at intervals in said record, an electric stop contact member cooperating with said aligning devices and a magnetic stop device thereby actuated to disengage said feed device to hold said record in aligned position, and a resetter device adapted to cooperate with route members arranged at intervals along the route of the vehicle to deenergize said stop contact member and restore the normal feeding of the record.

26. In mechanism adapted to feed a distance feed record having thereon route related indications, a record feed device to normally feed said record in substantial proportion to the distance traveled by the vehicle and at a rate at least several percent faster than corresponds to said route related indications, and means to intermittently effect the realignment of said record with respect to said feed device and restore the normal feeding action thereof.

27. In recorders or indicators, a record feed device comprising a normally operating feed clutch adapted to feed a record in substantial proportion to the distance traveled by the vehicle and at a rate somewhat faster than corresponds to the record indications, and record resetting aligning means comprising an electric stop circuit including an electric stop contact member adapted to cooperate with aligning devices in said record, and a stop device thereby actuated to disengage said feed clutch and hold said record in aligned position, and a resetter device adapted to cooperate with route members arranged at intervals along the route of the vehicle to break said stop circuit and restore the normal feeding of the record.

28. In feeding and aligning mechanism adapted to feed and intermittently realign a record having aligning devices at intervals, and having thereon route related indications, a record feed device to normally feed said record in substantial proportion to the distance traveled by the vehicle and at a rate a few percent at least faster than corresponds to said route related indications, an electric member adapted to cooperate with said aligning devices and connected resetting devices adapted to cooperate with route members arranged at intervals along the route of the vehicle to intermittently bring said record into aligned position and restart the normal feeding thereof.

29. In feeding and aligning mechanism adapted to feed and intermittently realign a record having aligning devices at intervals and having thereon route related indications, a record feed device to normally feed said record at a rate corelated to the speed of the vehicle and faster than corresponds to said route related indications, and resetting devices adapted to be actuated in connection with route members arranged at intervals along the route of the vehicle to intermittently bring said record into aligned position and restart the normal feeding thereof.

30. In recorders or indicators, a record feed device comprising a normally operating feed clutch adapted to feed a record in substantial proportion to the distance traveled by the vehicle, and record resetting aligning means comprising a stop contact member adapted to cooperate with aligning devices in said record, and a stop device thereby actuated to disengage said feed clutch and hold said record in aligned position, and a resetter device adapted to cooperate with route members arranged at intervals along the route of the vehicle to restore the normal feeding of the record.

31. In recorders or indicators, a record feed device comprising a feed clutch adapted to feed a record in substantial proportion to the distance traveled by the vehicle, and record resetting aligning means comprising a stop contact member to disengage said feed clutch, and a device adapted to cooperate with route members arranged at intervals along the route of the vehicle to restore the normal feeding of the record.

32. In recorders or indicators, a record, a record feed device to feed said record at a rate related to the speed of the vehicle, and record resetting aligning means adapted to cooperate with route members arranged at intervals along the route of the vehicle, and comprising aligning devices formed at intervals in said record, and a stop member cooperating therewith and holding said record in aligned position to periodically realign said record.

HARRY L. DUNCAN.

Witnesses:
  JESSIE B. KAY,
  CHARLES EBERHART.